United States Patent [19]

Dees et al.

[11] Patent Number: 5,145,013
[45] Date of Patent: Sep. 8, 1992

[54] SAND CONTROL WITH RESIN AND EXPLOSIVE

[75] Inventors: John M. Dees, Richardson; William J. Begnaud, Kingwood; Nancy L. Sahr, Montgomery, all of Tex.

[73] Assignee: Oryx Energy Company, Dallas, Tex.

[21] Appl. No.: 825,040

[22] Filed: Jan. 24, 1992

Related U.S. Application Data

[63] Continuation-in-part of Ser. No. 634,404, Dec. 27, 1990, Pat. No. 5,101,900, which is a continuation of Ser. No. 383,034, Jul. 21, 1989, abandoned.

[51] Int. Cl.⁵ .......................................... E21B 33/138
[52] U.S. Cl. .................................. 166/295; 166/299; 166/300
[58] Field of Search ............... 166/295, 276, 297, 299, 166/300, 63

[56] References Cited

U.S. PATENT DOCUMENTS

| | | | |
|---|---|---|---|
| 2,236,836 | 4/1941 | Prutton | 166/297 X |
| 2,756,826 | 7/1956 | Ebaugh | 166/299 |
| 2,911,046 | 11/1959 | Yahn | 166/299 X |
| 3,174,545 | 3/1965 | Mohaupt | 166/299 |
| 3,393,736 | 7/1968 | Goodwin | 166/295 |
| 3,415,319 | 12/1968 | Gibson | 166/295 |
| 4,009,757 | 3/1977 | Vann | 166/276 |
| 4,372,384 | 2/1983 | Kinney | 166/297 X |
| 4,936,385 | 6/1990 | Weaver et al. | 166/297 X |

*Primary Examiner*—George A. Suchfield
*Attorney, Agent, or Firm*—Pravel, Gambrell, Hewitt, Kimball & Krieger

[57] ABSTRACT

A method for diverting resins and other treating fluids used for sand control in wells drilled through unconsolidated subterranean formations is provided. Explosives placed in the wellbore in proximity to the treating solutions are actuated to divert the solutions through all perforations in the casing of the well and allow sand-free production of fluids through the well.

22 Claims, No Drawings

SAND CONTROL WITH RESIN AND EXPLOSIVE

This is a continuation-in-part of application Ser. No. 07/634,404, filed Dec. 27, 1990, now U.S. Pat. No. 5,101,900, which is a continuation of application Ser. No. 07/383,034, filed Jul. 21, 1989, now abandoned.

BACKGROUND OF THE INVENTION

1. Field of the Invention

This invention relates to methods of treating wells. More particularly, a method is provided for consolidating with resins a formation surrounding a well having perforated casing, wherein diversion of the treatment fluids to all perforations is assisted by detonation of an explosive in the wellbore.

2. Description of Related Art

Wells drilled into the earth for producing fluids from subterranean formations are usually equipped with casing. The casing is placed in the wellbore immediately following drilling of the well, cemented in place, and the casing is then perforated over the interval at the depth where fluid is to be produced or injected using perforating means, usually a shaped charge. Tubing is then placed inside the casing, usually with a packer near the bottom of the tubing to seal the tubing-casing annulus, and fluid is produced into the well through the perforations. If the sand in the formation is unconsolidated, individual grains of sand may move along with the fluid and enter the wellbore through one or more perforations. Sand particles in the wellbore may build up and prevent production of fluids from the well and sand particles in produced fluids may cause erosion of the well equipment. Therefore, it is desirable to prevent sand particle movement into the wellbore.

Various types of mechanical filters are placed inside wellbores and used to exclude formation sand particles from wellbores, but in some wells it has been found preferable to form a consolidated, permeable region of particles outside the perforations. This region is created by injecting liquid resin solutions through the perforations, injecting a fluid immiscible with the resin solution to decrease the resin saturation of the sand around the perforations, and polymerizing or allowing the resin to polymerize under conditions that the sand will be permeable. For sand to be permeable, the resin solution must not completely fill the pore spaces of the rock, but it should bridge between grains of the formation and serve as an adhesive between the grains. The fluids entering the well can then flow through the artificially consolidated region and enter the well. In many wells, particularly where the well has produced sand before the resin treatment, it is preferable to pre-pack the near-wellbore region outside the perforations by injecting a slurry of clean, sized sand grains or synthetic grains.

It is important in sand consolidation processes with resins that the grains around each perforation be consolidated. If this is not achieved, then grains from just one perforation can flow into the wellbore and can interfere with production from the well. This requires then that the consolidation process divert an adequate amount of resin to each perforation such that when the resin is polymerized, a consolidated region is formed that can withstand the forces induced by fluid flowing into each perforation Placing of resins in a formation is normally performed by pumping the resins into the tubing in a well and displacing the resin down the tubing by pumping a displacing fluid which will follow the resin into the formation. It is important that the resin be displaced from the wellbore before substantial polymerization has occurred.

Polymerization of resins is caused by catalysts or curing agents. Catalysts greatly accelerate the rate of polymerization, but do not participate in the reaction. Curing agents react with a component of the resin to form a polymer.

Sand consolidation with resins has been practiced for many years. The problem of diverting resin into each perforation has been approached in recent years by use of "gas generators" placed in the wellbore in proximity to the resin. U.S. Pat. No. 4,936,385 discloses igniting a propellant to generate gas pressure which rapidly forces the consolidating fluid through the perforations and into the subterranean formation.

As set out in *Encyclopedia of Chemical Technology*, Third Edition, Vol. 9, p. 561, propellants and explosives are chemical compounds or their mixtures that rapidly produce large volumes of hot gases when properly ignited. Propellants react or burn at relatively low rates, whereas explosives react or detonate at much higher rates. Propellants have been made available for use in wells in recent years in the devices which are called gas generators. One such product is sold under the trademark STRESSFRAC. The use of such gas generators is believed to force resin through all perforations and result in a more effective sand consolidation process. Explosives have heretofore been used in wells, primarily for freeing threaded pipe connections when under torque to allow recovery of partial pipe strings ("string shots"). Explosives have been proposed for promoting the reaction of chemicals used to treat wells in U.S. Pat. No. 2,756,826.

While gas generators employing propellants have been disclosed and are believed to provide more effective sand consolidation processes with resins, there remains the need to employ less expensive and more widely available techniques which can be implemented with greater flexibility and employed to divert resin and any other treating fluid used with the resin to all perforations during sand consolidation treatments.

SUMMARY OF THE INVENTION

In one embodiment, resin solution is placed in casing such that it occupies the interval of casing having perforations, an explosive is detonated in the wellbore in proximity to the resin to divert the resin to all perforations in the casing, the remaining resin solution is displaced from the casing and the resin is subsequently polymerized by injection of a catalyst solution. In another embodiment, resin having in solution with the resin a chemical to cause the resin to polymerize is placed in casing such that it occupies the interval of casing having perforations, an explosive is detonated in the casing in proximity to the resin to divert the resin to all perforations, and the remaining resin is displaced from the casing and allowed to polymerize.

DESCRIPTION OF PREFERRED EMBODIMENTS

Our invention can be used to consolidate formations outside casing having any types of holes or openings for fluid flow, using either catalysts or curing agents to polymerize a resin. The catalyst or curing agent is added to the resin in some cases and in some cases the catalyst or curing agent is injected into the well in solution in a liquid solvent after the resin solution has been injected and has been displaced to a low enough saturation to allow permeability in the formation after the resin is polymerized. In the latter cases, the catalyst or curing agent in a liquid solvent transfers from the solvent solution to the immobile resin solution in the pore spaces and causes the resin to polymerize. It is important that the displacing fluid and the catalyst-containing fluid, when used, also enter each perforation in the casing, such that the resin which has been injected through the perforation will be reduced in saturation around the perforation and polymerized to consolidate the sand around the perforation. It is preferred to prepack the near-wellbore region outside the perforations by injecting a slurry of clean, sized sand grains or other particles, and then to wash excess sand from the wellbore before resin is first injected into the well. The pre-packed sand grains left outside the perforations are then consolidated by the resin treatment.

The resin solutions and other fluids of this invention are placed in the casing of the well using conventional techniques. The resin solution should occupy the casing at least over the depth interval where perforations exist in the casing before any explosive device is actuated to drive the resin solution through the perforations. Normally, the resin solution will extend for some distance above the perforations. The fluid to be used to displace the resin solution from the casing and to decrease saturation of the resin solution in the sand outside the casing is placed in the well directly above the resin solution. If an explosive device is to be used to divert this displacing fluid to all perforations, this fluid should occupy the casing at least over the depth interval where perforations exist in the casing when a second explosive device is actuated. Normally, this fluid will extend for some distance above the perforations. Similarly, if an explosive device is to be used to divert the catalyst solution to all perforations, this fluid is placed in the casing at least over the interval where perforations exist in the casing before the explosive device is actuated. After the explosive device is actuated in a fluid to be diverted, the fluid is displaced or pumped through the perforations and into the formation surrounding the well.

At least one explosive device is used in the method of this invention, but it may be combined with the use of a gas generator device. The explosive is placed in proximity to the solution to be diverted through the perforations. The device will normally be immersed in the solution to be diverted and in the perforated interval of the casing, but it may be located within a short distance above or below the perforated interval. Explosive devices create a high pressure in the casing over a short period of time, whereas gas generator devices create a high pressure in the casing over a longer period of time.

Preferred types of resins are furans, phenolicfuran, phenol-formaldehyde and epoxy. Resins are often injected after dilution with a solvent. Furans are normally used with an external catalyst, this catalyst being an acid. With some explosives, an acid gas is produced by reaction of the explosive in the wellbore, and this acid gas may partially polymerize the resin. Epoxies are normally used with either a curing agent in the resin, with a pot life selected to allow placement of the solution before it polymerizes, or with a curing agent added in a hydrocarbon solvent which is injected after the resin solution. The amount of resin solution used in a well will depend on the length of formation in contact with the wellbore to be consolidated, but in each well an effective amount is used to consolidate the formation such that particles of the formation do not flow into the wellbore through the perforations after the resin is polymerized. The use of the explosive of this invention can decrease the amount of resin which must be placed in a well to achieve effective sand consolidation, since resin will be more effectively diverted to each perforation.

Any resin employed should be reduced in saturation in the formation by following resin injection into the formation with injection of a displacing fluid immiscible with the resin before the resin polymerizes. This insures that the formation will have permeability to fluids after the resin is polymerized. The displacing fluid is placed in the tubing directly above the resin and injected into the formation directly after the resin is injected. The immiscible fluid directly in contact with the resin solution should contain no catalyst or curing agent, such that mixing in the wellbore will not cause the resin to polymerize before it enters the formation This fluid may be a brine solution or may be a gas such as nitrogen. An effective amount of displacing fluid is used to displace the resin to a lower saturation and establish permeability through the formation. If the displacing fluid is a liquid, ignition of an explosive in the wellbore in proximity to this displacing fluid while the displacing fluid is in contact with the perforations may assist in achieving more uniform permeability from all the perforations.

In using resins which are polymerized by injection of a catalyst solution, such as a furan resin, which is polymerized with an acid catalyst, ignition of an explosive in the wellbore in proximity to the catalyst solution while the catalyst solution is in contact with the perforations will assist in achieving more uniform polymerization of the resin around all the perforations. Alternatively or in conjunction with an explosive, a particulate diverting agent can be added to the catalyst solution to assist in diverting this solution to all perforations. Such diverting agents are well-known in industry, and are exemplified by such commercial products as those sold by Halliburton Services under the trademark MATRISEAL.

The explosives of this invention are detonated by means commonly used in industry. An igniter or detonator is connected to an electric wireline. An electrical signal is sent through the wireline to explode the detonator. An explosive is in close proximity to the igniter and it is caused to detonate from the high pressure shock wave from the igniter.

The use of diode switches to provide "select fire" capabilities for perforating the casing in wells is well known. Diode switches can also be used to actuate two or more explosives at different times or to actuate desired combinations of perforating devices, explosive and propellant devices of this invention. Diode switches can be used to actuate an explosive in tandem with a perforating gun or a gas generator. The explosive can be used in connection with treatment of existing perforations in a well and the perforating gun can then be fired to form additional perforations. Conversely, perforating may be accomplished prior to the firing of the explosive in proximity to the resin, the displacing fluid or the catalyst stage. For example, diode switches can be used to actuate an explosive and a propellant device during the same wireline run into a well. The repeated firing of an explosive alone or in combination with gas generators in proximity to a resin or other treating fluid increases the probability of treating every perforation in the well with the fluid in alignment with the perforations when the explosive or gas generator is actuated.

The tandem variations above allow for initial explosive use in the resin portion and subsequent explosive use in either the resin, the catalyst or in the displacing fluid behind the resin without having to make a second wireline trip or without having to rig down the lubricator to pull the tool out of the well.

Fast-burning chemical systems which produce a detonation are referred to herein as explosives. The explosive can be made from a variety of chemicals. Aliphatic nitrate esters, such as PETN, can be used. Nitramines such as RDX and HMX can be used. Mixtures of explosives can be used. Explosive mixtures based on ternary systems containing TNT and aluminum can be used. A propellant may also be mixed with the explosive.

The physical shape of the explosives can vary, but is preferably an elongated cylinder or cord. The explosive can be bonded or molded into the preferred shape or can be contained in a flexible or rigid container. Flexible cords of explosive commonly used in wells are sold under the name PRIMACORD. These are available with differing amounts of explosive per foot of cord and can easily be prepared in selected lengths. Such cords are a preferred explosive for our invention. The cords can be wrapped around rigid bars for placing them in wells. To allow use of the explosive cord along with a perforating gun, the cord can be wrapped around a hollow-carrier perforating gun or can be wrapped around bars connected to the perforating gun. A separate detonator or igniter configured for the gun and the cord can provide tandem capability for longer intervals, eliminating or reducing the need for additional wireline runs in a well.

In using explosives or propellants in wells, it is necessary to limit the amount of reacting chemical materials to avoid damaging the casing of the well.

EXAMPLE 1

An oil well produced excessive amounts of sand through the perforations and required working-over to clean the well and to treat it to prevent sand entering the well after production resumed. First, the wellbore was cleaned of the produced sand. The 10-feet of perforated interval was then pre-packed with 2500 pounds of 20–40 mesh Ottawa sand pumped as a slurry in a water-base fluid. The excess sand was cleaned from the well. Then 530 gallons of HYDROFIX furan resin was spotted across the perforations, using field salt water having a density of 9 ppg as the displacing fluid. A 12-foot section of PRIMACORD containing 100 grains of explosive per foot was then looped in a double strand along a rod to form a 6-foot section of explosive having 200 grains per foot. The explosive was lowered into the well on electric wireline and placed across the perforated interval of the wellbore. The cord was then detonated. Then 420 gallons of the field salt water was injected to displace the resin solution remaining in the wellbore through the perforations and reduce the resin saturation in the formation. Following the field salt water displacing fluid, 2500 gallons of 15% hydrochloric acid solution was injected to catalyze the resin. The acid solution contained corrosion inhibitor and 1% of a particulate diverting agent, MATRISEAL O, to assist in diverting the acid solution to all perforations. The well was shut-in overnight to allow the resin to polymerize. When the well was subsequently produced, the fluids contained negligible amounts of sand, and the results of the treatment were considered to be highly successful.

Initial plans were to run a gas generator device in the well after the detonation of the PRIMACORD, but the gas generator device was not successfully actuated in the well. Surprisingly, the detonation of the PRIMACORD explosive supplied an effective amount of diversion of resin to all perforations.

What we claim is:

1. A method for treating a well having perforated casing to prevent solids movement through the perforations and into the wellbore comprising:
    (a) positioning a quantity of liquid resin solution such that the solution occupies the interval of the casing having perforations;
    (b) positioning an explosive in proximity with the liquid resin solution;
    (c) detonating the explosive;
    (d) displacing the liquid resin solution remaining in the wellbore after step (c) through the perforations with a displacing fluid; and
    (e) injecting a chemical solution through the perforations to cause the resin to polymerize to form a consolidated permeable matrix.

2. The method of claim 1 wherein the resin is selected from the group of resins consisting of furan, phenolic-furfuryl, phenolic, phenol-formaldehyde and epoxy.

3. The method of claim 1 wherein the explosive is in the form of a cord comprising an explosive material.

4. The method of claim 1 wherein an explosive is actuated two or more times in proximity with the liquid resin solution while the resin solution occupies the interval of the casing having perforations.

5. The method of claim 1 wherein an explosive and a gas generator are actuated in proximity with the liquid resin solution while the resin solution occupies the interval of the casing having perforations.

6. The method of claim 1 wherein an explosive is placed in proximity with the displacing fluid of step (d) and actuated while the fluid occupies the interval of the casing having perforations.

7. The method of claim 1 wherein an explosive and a gas generator are actuated in proximity with the displacing fluid of step (d) while the fluid occupies the interval of the casing having perforations.

8. The method of claim 1 wherein an explosive charge is placed in proximity with the chemical solution of step (e) and actuated while the chemical solution occupies the interval of the casing having perforations.

9. The method of claim 1 wherein an explosive and a gas generator are placed in proximity with the chemical solution of step (e) and actuated while the solution occupies the interval of the casing having perforations.

10. The method of claim 1 further comprising actuating a perforating gun to form additional perforations in the casing after step (c) and before step (d) and subsequently repeating steps (a), (b) and (c).

11. The method of claim 1 further comprising adding a particulate diverting agent to the chemical solution of step (e) before the solution is placed in the well.

12. The method of claim 1 wherein the near-wellbore region is pre-packed with sand or other particles before step (a).

13. A method for treating a well having perforated casing to prevent solids movement through the perforations and into the wellbore comprising:
    (a) positioning a quantity of liquid resin solution such that the solution occupies the interval of the casing having perforations, the resin solution comprising a chemical to cause the resin to polymerize;

(b) positioning an explosive in proximity with the liquid resin solution;

(c) detonating the explosive;

(d) displacing the liquid resin solution remaining in the wellbore after step (c) through the perforations with a displacing fluid and injecting the displacing fluid through the perforations to reduce the saturation of resin solution in the formation, the displacing fluid being immiscible with the resin solution; and (f) allowing the resin to polymerize to form a consolidated permeable matrix.

14. The method of claim 13 wherein the resin is selected from the group of resins consisting of furan, phenolic-furfuryl, phenolic, phenol-formaldehyde and epoxy.

15. The method of claim 13 wherein the explosive is in the form of a cord comprising an explosive material.

16. The method of claim 13 wherein an explosive is actuated two or more times in proximity with the liquid resin solution while the resin solution occupies the interval of the casing having perforations.

17. The method of claim 13 wherein an explosive and a gas generator are actuated in proximity with the liquid resin solution while the resin solution occupies the interval of the casing having perforations.

18. The method of claim 13 wherein an explosive is placed in proximity with the displacing fluid of step (d) and actuated while the displacing fluid occupies the interval of the casing having perforations.

19. The method of claim 13 wherein an explosive and a gas generator are actuated in proximity with the displacing fluid of step (d) while the fluid occupies the interval of the casing having perforations.

20. The method of claim 13 further comprising actuating a perforating gun to form additional perforations in the casing after step (c) and before step (d) and subsequently repeating steps (a), (b) and (c).

21. The method of claim 13 further comprising adding a particulate diverting agent to the displacing fluid of step (d) before the fluid is placed in the well.

22. The method of claim 13 wherein the near-wellbore region is pre-packed with sand or other particles before step (a).

* * * * *